(12) United States Patent
Mamich

(10) Patent No.: US 6,182,464 B1
(45) Date of Patent: Feb. 6, 2001

(54) SELF-CHILLING BOTTLE FOR A BICYCLE AND THE LIKE

(76) Inventor: Harvey R. Mamich, 23 Penstemon, Littleton, CO (US) 80127

(*) Notice: Under 35 U.S.C. 154(b), the term of this patent shall be extended for 0 days.

(21) Appl. No.: 09/370,565

(22) Filed: Aug. 9, 1999

Related U.S. Application Data

(60) Provisional application No. 60/095,860, filed on Aug. 10, 1998.

(51) Int. Cl.[7] .................................................. F28D 5/00
(52) U.S. Cl. ............................................. 62/316; 62/457.3
(58) Field of Search ............................. 62/457.3, 457.4, 62/315, 316

(56) References Cited

U.S. PATENT DOCUMENTS

| | | | |
|---|---|---|---|
| 2,775,872 | * | 1/1957 | Bell .......................................... 62/91 |
| 3,563,243 | * | 2/1971 | Lindquist ............................... 128/287 |
| 4,955,516 | * | 9/1990 | Satterfield ............................... 224/35 |

* cited by examiner

Primary Examiner—William Doerrler
Assistant Examiner—Melvin Jones
(74) Attorney, Agent, or Firm—Edwin H. Crabtree; Ramon L. Pizarro; Donald W. Margolis

(57) ABSTRACT

The self chilling liquid container including a bottle having a top portion with an opening therein for filling the bottle and a removable cap, a closed bottom portion and an elongated center portion. An absorbent elastic exterior shell is received around an outer circumference of the center portion and secured thereto. The exterior shell may be permanently attached to the center portion or removably attached. When the exterior shell is saturated with water and is exposed to the atmosphere, the liquid within the shell evaporates at ambient temperature thus chilling the liquid inside the bottle by heat transfer. The chilling effect is substantially increased by airflow flowing past the flexible shell. In this manner, the primary source of heating of a liquid in the container, that is air flow, is changed to a primary source of cooling the liquid. The exterior shell is made of a hydrophilic open-cell elastomeric material that has sufficient thickness and void-volume to absorb several ounces of a cooling medium (i.e., water) and thus can provide an active evaporative cooling capability for the duration of the bicycle ride. In the event that all of the cooling medium evaporates from the shell, the enclosure material will still act as an insulator.

20 Claims, 2 Drawing Sheets

SELF-CHILLING BOTTLE FOR A BICYCLE AND THE LIKE

This application is based on a provisional application by the subject inventor filed on Aug. 10, 1998 and having Ser. No. 60/095,860.

BACKGROUND OF THE INVENTION (a) Field of the Invention

This invention relates to liquid containers and more particularly, but not by way of limitation, to a liquid container for mounting on a vehicle such as a bicycle wherein the liquid in the container is cooled using evaporative cooling.

(b) Discussion of Prior Art

There are many bicycle-type water bottles currently available on the market. The most popular water bottle design is a squeezable bottle of a generally cylindrical shape which can be readily grasped by the cyclist and removed from a bicycle cage which is mounted to the bicycle frame. Once the bottle is in hand, a valve in the top of the bottle is opened and the cyclist squeezes the bottle to expel the water through the valve.

The typical water bottle used by the cyclist is made of plastic with a single shell wall. A drawback of the single shell wall design is that this type construction provides poor insulation and the liquid inside the bottle is undesirably warmed by the sun or a high ambient temperature during a summer bicycling season. To make matters worse, a heat transfer rate to the inner liquid is significantly increased by a convective heat transfer caused by the flow of hot air against the outside of the bottle.

Heretofore, a typical solution attempted by most cyclists is to fill the bottle with ice or the freeze the entire bottle before leaving for a bicycle ride. Unfortunately, the above mentioned high heat transfer rate makes this solution effective for only a relatively short time compared to the length of average bicycle ride. This also has the disadvantage of requiring the cyclist to have the forethought to freeze the bottle and/or ice several hours before the bicycle ride. Further, this solution also has a disadvantage of providing the cyclist the coldest water at the beginning of the ride when it is least needed and the warmest water at the end of the ride when it is most undesirable. Finally, an ice-cold drink of water may not be desirable on an extremely hot day. It would be more preferable to have water chilled to 20 to 30 degrees Fahrenheit below the ambient temperature so as not to unduly chill the cyclist's throat.

A common solution offered by bottle manufactures is to provide a bicycle bottle with one or more layers of insulating material to reduce the heat transfer rate to the liquid inside the bottle. A significant disadvantage of such a design is that the inner volume of the liquid must be reduced in order for the insulated bottle to fit into a standard hanging device. In addition, the high heat transfer rates are only marginally reduced and the cyclist is still left with undesirable warmed water at the end of the bicycle ride.

An alternate solution recently introduced in the market is to provide a built-in compartment for a frozen gel-pack. With this design the cyclist is required to freeze the gel-pack several hours before the bicycle ride and then must insert it into the bottle before leaving. This design suffers from the disadvantage that the built-in compartment for the frozen gel-pack significantly reduces the volume of the inner liquid. In addition, if an attempt is made to reduce the rate of heat transfer by adding a layer of insulation then the inner volume is reduced even further.

The principal of cooling foods and liquids by storing the same in containers of porous material which could be soaked in water is well known. For example, U.S. Pat. No. 4,380,157 describes a self-chilling dispenser for drinking fluids. This and other such designs are typically made of a rigid porous clay material and as such are not suited for bicycle travel. Alternatively, evaporative cooled water bags made of a flax material are also available in the marketplace. These, however, suffer from the disadvantage of having no clear way of being attached to a bicycle and thus are not suitable for rapid movements required in bicycle travel.

In U.S. Pat. No. 4,544,077 to Rucker, a liquid container for a bicycle is described wherein a container body includes a slot therein for allowing water to pass into contact with a exterior liner for providing evaporative cooling. A significant disadvantage of this design is that the liner has a very low liquid carrying capacity, thus the rider must inconveniently re-saturate the liner by manually opening and closing the slot at regular intervals or the evaporative cooling effect will be lost. This design also has the disadvantage that any liquid dispensed from the slot is not available for the rider to drink. In addition, the liner described in this patent is not designed to meter the liquid flow and thus if the slot is inadvertently left open, the liquid will rapidly leak out leaving the rider without water. Finally, attempts to use this design for sugary liquids such as fruit juice would cause the exterior liner to become sticky and undesirable to the touch, and thus an extensive cleaning process would be required before the next use.

In the marketplace today, there are currently two different prior art evaporatively cooled water bottles with shells which are advertised to the public. The first product is called by a brand name of "COOLSOCK". The shell of this item is made of a natural fiber such as cotton or felt encased in a sewn synthetic fabric cover. The natural fibers have the distinct disadvantage of promoting mold or mildew growth if left in a saturated condition. In addition, there is no convenient way of attaching the fabric cover to the natural fiber, thus the cover easily moves relative to the fiber thereby making it subject to tearing and bunching. Also, the natural fiber provides no stretch. Therefore, an additional means for retaining the shell on the bottle is required, adding to the manufacturing cost. Also, natural fibers do not readily absorb and retain water as effectively as the hydrophilic foam used in the subject invention. This leads to shorter periods of performance or requires increased shell thickness which is not desirable.

The second product, called by a brand name of "RUNNIN' COOL", is an insulted water bottle which claims to have the components necessary for evaporative cooling. An insulating material, called by a brand name of "THERMOLITE", made by Dupont, is layered with a standard foam and fabric. Neither the insulating material or the foam have any hydrophilic properties and thus this product can not match the absorption and water retention capabilities of the invention described herein. This insulated water bottle relies on water condensing from the air and then evaporating to achieve a cooling effect which is ineffective as any heat removed by the evaporation is gained during condensation.

With the above in mind, none of the prior art liquid bottles and evaporatively cooled bottles with covers and shells provide a consistently cool liquid for a cyclist to drink over a duration of an average bicycle ride. Therefore, a need exists for an improvement of existing bottle construction so as to enhance bottle performance in maintaining a desired temperature of the liquid in the bottle for the duration of the bicycle ride. The subject self-chilling liquid container solves the above mentioned problems with the advantages described herein.

SUMMARY OF THE INVENTION

In view of the foregoing, it is a primary object of the present invention to provide a self-chilling liquid container for water and other liquids which is readily adaptable for releasable attachment to a bicycle and other outdoor vehicles, wherein the container has a liquid absorbing exterior shell surrounding the sides of the container such that when the shell becomes wet and is exposed to ambient air, evaporation of the liquid in the shell occurs thereby cooling the liquid in the container making it more refreshing to drink.

Another object of the invention is to provide a liquid container that utilizes the ambient air flow past the container to substantially improve the evaporative cooling efficiency thus cooling the liquid in the container to a temperature as low as the wet-bulb temperature. This changes the primary source of heating the liquid in the container (i.e., the air flow) into the primary source of cooling for the liquid.

Yet another object of the invention is to provide an improved liquid container of the type described wherein the exterior shell has the capacity to absorb enough evaporative cooling medium (i.e., water) to keep the liquid in the container at a desirable temperature for the duration of the bicycle ride.

A further object of the invention is to provide a shell that inhibits mold or mildew when the shell is left in a saturated condition.

Another object of the invention is to provide exterior and interior liners that are permanently attached to an absorbent shell material thus improving the durability of the shell and making it less prone to tearing and bunching.

Still another object of the invention is to provide a bottle cover which is an elastic absorbent shell that can be easily stretched over a variety of shapes and sizes of containers for evaporative cooling purposes. This also eliminates the need for an additional means of retaining the bottle in the shell.

Yet another object of the invention is to improve the water absorption and retention properties of the shell by making it out of a hydrophilic material. This extends the period of cooling without increasing the shell thickness.

A further object of the invention is to provide an exterior shell of the type described that will act as an insulator even after the cooling medium has been evaporated.

Yet another object of the invention is to provide improved cooling efficiency by laminating a wicking fabric to the exterior shell. The wicking fabric will draw the liquid from the interior of the shell and cause it to migrate to all portions of the fabric providing a large surface for evaporation and hence greater cooling.

Still another object of the liquid container is to eliminate the need of adding ice to the liquid, freezing the liquid, and using gel-pack to cool the liquid in the container.

A further object of the invention is to provide a container that can store and evaporatively cool sugary liquids without the exterior surface becoming sticky or undesirable to the touch.

The self chilling liquid container includes a bottle having a top portion with an opening therein for filling the bottle and a removable cap, a closed bottom portion and an elongated center portion. The bottle may be made of a flexible plastic or like material. An absorbent elastic exterior shell is received around the outer circumference of the center portion and secured thereto. The exterior shell may be permanently attached to the center portion or removably attached. When the exterior shell is saturated with water and is exposed to the atmosphere, the liquid at the exterior surface of the shell evaporates at ambient temperature thus chilling the liquid inside the bottle by heat transfer. The chilling effect is substantially increased by airflow flowing past the flexible shell. In this manner, the primary source of heating of a liquid in the container, that is air flow, is changed to a primary source of cooling the liquid. The exterior shell is made of an open-cell elastomeric material, such as hydrophilic polyurethane foam and like materials, that has sufficient thickness and void-volume to absorb several ounces of a cooling medium (i.e., water) and thus can provide an active evaporative cooling capability for the duration of the bicycle ride. In the event that all the cooling medium does evaporate from the shell, the enclosure material will still act as an insulator.

A stretchable fabric may be laminated to the exterior surface of the shell to provide structural reinforcement and reduced friction when the invention is inserted or withdrawn from a standard water bottle cage. A hydrophilic fabric laminated to the exterior surface of the shell is preferable as it will draw the liquid from the interior of the shell and cause it to migrate to all portions of the fabric providing a larger surface area for evaporation and hence more efficient cooling even when the liquid content in the shell is low. A stretchable fabric may also be laminated to the interior surface of the shell to provide structural reinforcement and reduced friction when the bottle is inserted or withdrawn from the shell during manufacture or as needed for cleaning.

Although a bottle will generally be provided with the subject invention, the aforementioned exterior shell may also be sold separately thus allowing an individual to cool a previously purchased bottle or container of a similar size.

These and other objects of the present invention will become apparent to those familiar with water bottles and containers and the use of hydration devices used with bicycles and other outdoor vehicles when reviewing the following detailed description, showing novel construction, combination, and elements as herein described, and more particularly defined by the claims, it being understood that changes in the embodiments to the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments of the present invention according to the best modes presently devised for the practical application of the principles thereof, and in which.

DESCRIPTION OF THE PREFERRED EMBODIMENTS

Figure 1:
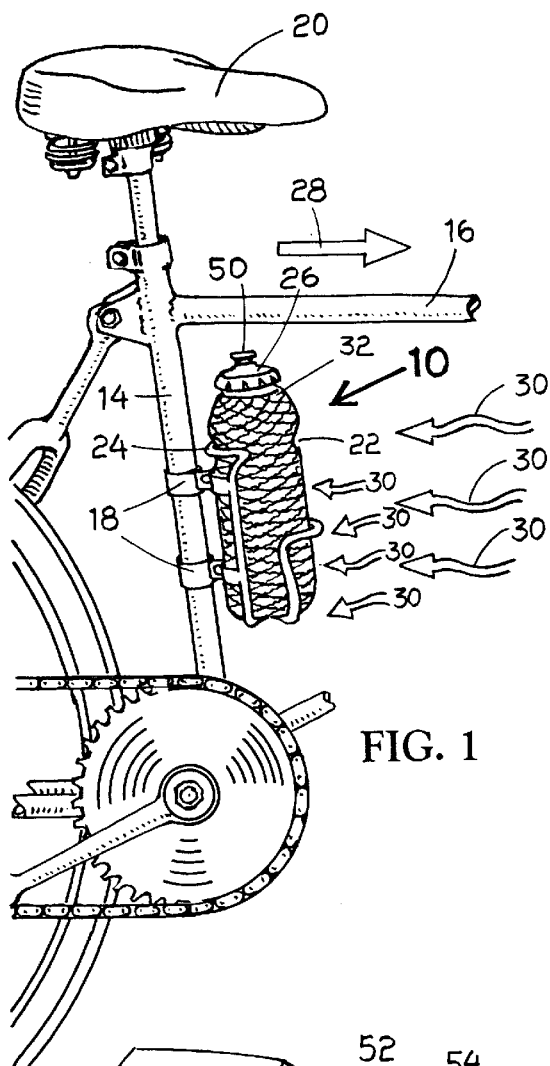
FIG. 1 is a perspective view of a portion of a bicycle and the subject invention received inside a container carrying cage mounted on the bicycle.

In FIG. 1, the subject self-chilling liquid container is designated by general reference numeral 10. The container 10 is shown received inside a standard carrying cage 12. The cage 12 may be mounted to an upright member 14 of a bicycle frame 16 by bosses 18 below a seat 20. The container 10 has a circumferential indention 22 that is adapted for receipt against a retaining member 24 of the standard bottle cage 12. The container 10 is removed from the cage 12 by grasping the container near a container cap 26 and pulling the container away from the retaining member 24 and then pulling upward. While the cage 12 is shown in this drawing, it should be kept in mind that any variety of devices such as clips, mounting brackets and the like can be used for releasably securing the container 10 to the bicycle frame 16 and allowing the cyclist ready access for quickly obtaining a drink of water or any other cooling liquid that might be stored inside the container 10. Arrow 28 indicates the direction of the bicycle and arrows 30 indicate air flow received on and around the container 10.

Figure 2:
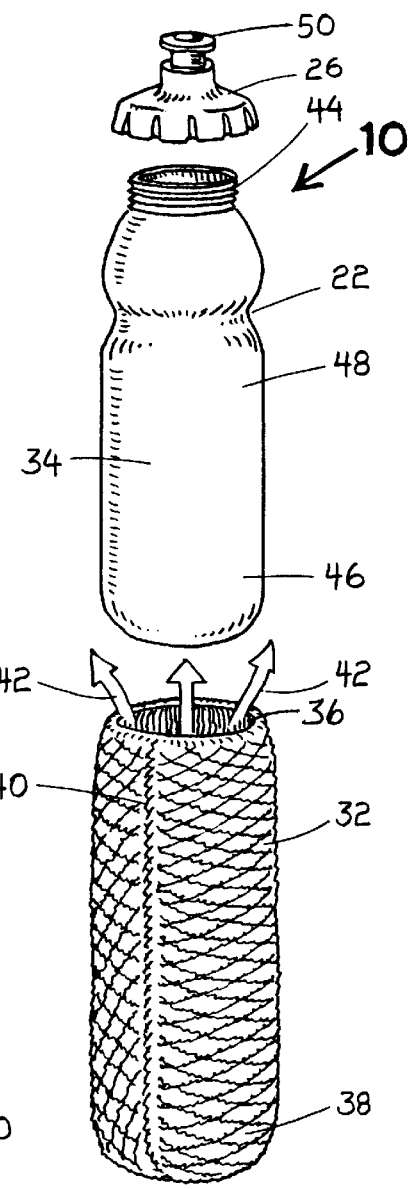
FIG. 2 is an exploded view of the self-chilling liquid container with the elastic absorbent exterior shell positioned for receipt around the bottle.
Figure 2A:
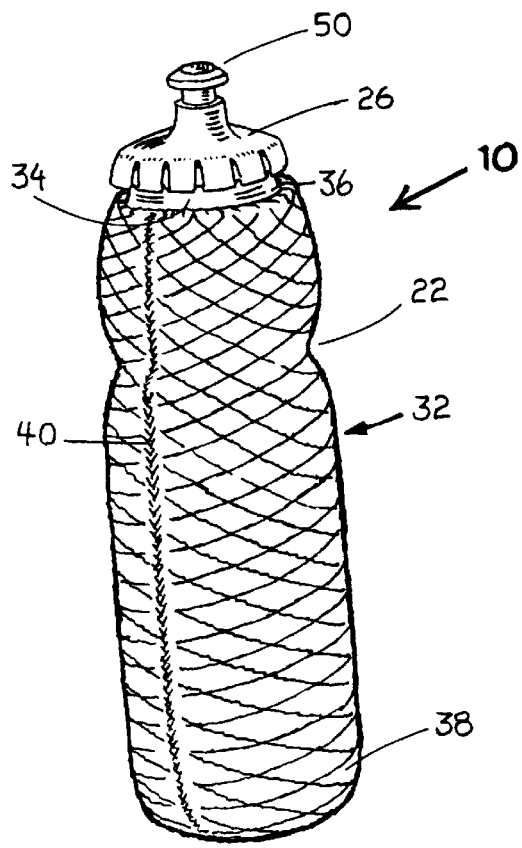
FIG. 2a illustrates the self-chilling liquid container shown in FIG. 2 with the absorbent exterior shell received around the bottle.

In FIG. 2, the container 10 is shown with its individual elements. The elements include a container cover which is in the form of an exterior elastic absorbent shell 32, a bottle 34 and the removable container cap 26. The elastic absorbent shell 32 has an open top portion 36, a closed bottom portion 38, and is sewn along seam 40. The elastic shell 32 is shown in position for elastic expanding, as indicated by arrows 42, and receipt around the bottle 34 as shown in FIG. 2a. The exterior shell 32 can be made of various types of material designed to absorb several ounces of water while still being thin enough to allow easy insertion and removal of the container 10 from cage 12. The exterior shell 32, made of an elastic material, is a significant advantage from a manufacturing perspective, in that precise pattern cutting and sewing are not needed. Thus, a simple pattern may be cut and sewn and then placed on a variety of bottle designs. The exterior shell 32, made of an elastic material, also eliminates the need for an additional means of retaining the bottle 34 in the shell 32 if the exterior shell 32 has a smaller diameter than the bottle 34 such that the exterior shell 32 must be stretched over the bottle 34 during manufacture.

In this drawing, the bottle 34 has a threaded top portion 44 with an opening therein for filling the bottle 34, a closed bottom 46, and elongated center 48 with the circumferential indention 22 and the threaded removable cap 26. The diameter of the exterior shell 32, before it is placed on the bottle 34, is such that the shell 32 will substantially conform to the circumferential indentation 22 when placed on the bottle 34. The bottle 34 may be made of a flexible plastic and like materials. The top of the cap 26 includes a reciprocating valve member 50 which can be easily opened to obtain a drink of the liquid in the container. While the cap 26 is shown with its reciprocating valve member 50, it can be appreciated that there can be many different types of bottles and fill cap designs without departing from the spirit and scope of the invention as described herein.

To use the self-chilling container, the exterior shell 32 is at least partially hydrated with water and preferably hydrated to saturation. The hydration process can be accomplished by manually compressing and releasing the shell 32 while it is immersed in a volume of water or held under running water. The shell 32 may be hydrated while received around the bottle 34 or separate from it. The filled container 10 can then be put into an operative position where it is to be contacted by air flow 30. When the shell 32 is exposed to the atmosphere, evaporation occurs, causing a cooling effect which chills the liquid in the bottle 34 by virtue of the thermal interchange relationship between the bottle 34 and the shell 32. The chilling effect is substantially increased by airflow 30 flowing past the elastic shell, thus cooling the shell to a temperature as low as the wet-bulb temperature. Thereby in this manner, the primary source of heating the container, that is air flow 30, is changed to a primary source of cooling the liquid. The liquid carrying capacity of the exterior shell 32, being controlled by the thickness and void-volume and hydrophilic properties of the shell material, is such that it can hold several ounces of water thus providing an active evaporative cooling capability for the duration of a bicycle ride. In the event of all of the cooling medium evaporating from the shell 32, the shell material will act as an insulator.

Figure 3:
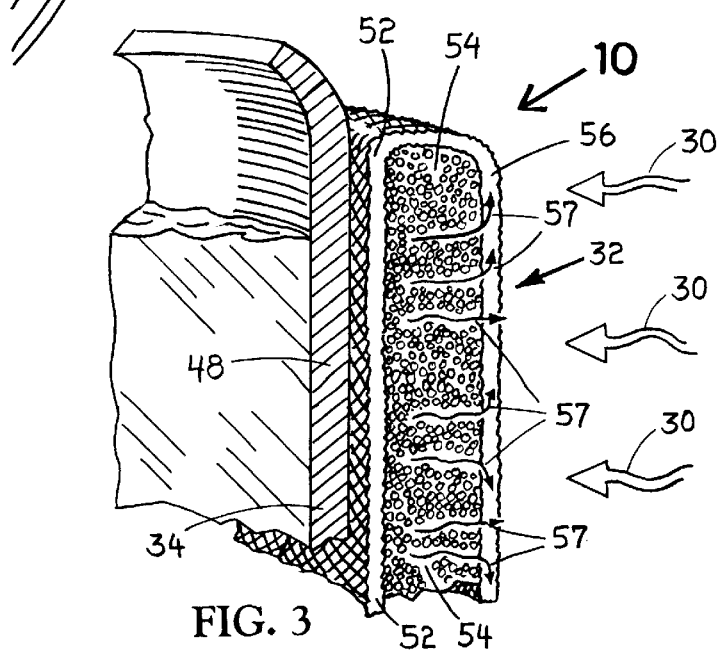
FIG. 3 illustrates an enlarged sectional view of a portion of the bottle and exterior shell illustrating liquid movement in the exterior shell of the subject invention.

In FIG. 3 an enlarged sectional view of a portion of the center 48 of the bottle 34 is shown along with a portion of the exterior shell 32. In this example, the shell 32 includes a stretchable fabric interior liner 52 disposed next to an inside of a high void-volume open cell elastomer center section 54. Also, the shell 32 includes a stretchable fabric exterior liner 56 disposed next to an outside of the center section 54. While the open cell elastomer center section 54 is shown, the preferred center section material is an open cell polyurethane with pores in a range from 70 to 90 and greater per linear inch. For example, a hydrophilic polyurethane foam has been found to be superior as a liquid-absorbing and liquid-retaining media.

The fabric interior liner 52 provides structural reinforcement and reduced friction when the bottle 34 is inserted or withdrawn from the shell 32 during manufacture or as needed for cleaning. The fabric exterior liner 56 provides structural reinforcement and reduced friction when the bottle 34 is inserted or withdrawn from the cage 12. A hydrophilic fabric is preferred for the exterior fabric liner 56 as it will draw the liquid from the interior of the shell and cause it to migrate to all portions of the fabric providing a large surface area for evaporation and hence greater cooling efficiency. The hydrophilic fabric is also preferred for the exterior fabric liner 56 as it aids in the wetting of the shell 32. Note arrows 57, shown in this drawing, illustrate the migration of the liquid outwardly from the high void-volume open cell elastomer center section 54 and through the exterior fabric liner 56. Also, a hydrophilic fabric may be used with the interior fabric liner 52. The structural integrity of the shell 32 is enhanced if the exterior liner 56 and the interior liner 52 are permanently bonded to the elastomer center section 54.

Figure 4:
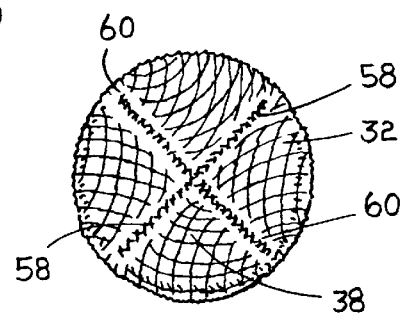
FIG. 4 illustrates a stitching pattern that may be used to close the bottom portion of the elastic exterior shell.

In FIG. 4, an example of a stitching pattern 58 and 60 is illustrated that may be used to close the bottom portion 38 of the elastic exterior shell 32. In this view, the shell 32 is shown received around the bottle bottom 46. While the stitching pattern 58 and 60 are shown, it should be kept in mind that various alternate means of closing the bottom portion 38 of the shell 32 can be used or the bottom portion 38 can be removed completely without departing from the spirit or scope of the invention.

Figure 5:
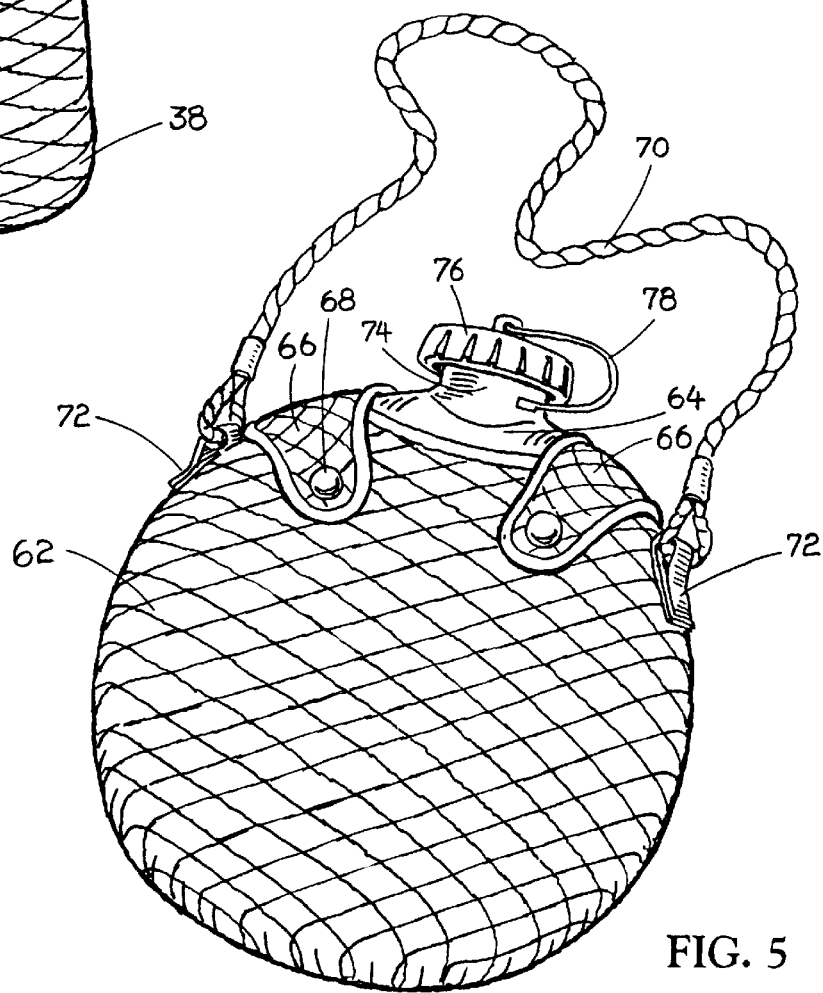
FIG. 5 illustrates an alternate form of the subject invention wherein the exterior shell is received over a different shape of water bottle.

In FIG. 5, an alternate form of the self-chilling container is shown. In this view, an absorbent exterior shell 62 and container 64 are disk shaped with a large diameter to width ratio. The shell 62 is similar in structure to the absorbent shell 32 discussed above. The shell 62 has flap 66 with snaps 68 to retain the container 64. The shell 62 also has a carrying handle 70 which is secured to the shell 62 with attachment straps 72. The container 64 has a threaded spout 74 and a cap 76 with tie 78. The tie 78 prevents the cap 76 from being lost.

As mentioned above, there may be many variations of liquid bottles and different sizes and shapes of bottles along with different types of porous exterior shells and materials used in making the exterior shells without departing from the spirit and scope of the invention.

While the invention has been shown, described and illustrated in detail with reference to the preferred embodiments and modifications thereof, it should be understood by those skilled in the art that equivalent changes in form and detail may be made therein without departing from the true spirit and scope of the invention as claimed, except as precluded by the prior art.

The embodiments of the invention for which an exclusive privilege and property right is claimed are defined as follows:

1. A bottle cover for a liquid bottle used on a bicycle and other outdoor vehicles, the liquid bottle supported by a hanging device mounted on the bicycle, the bottle having a open top portion, an elongated center portion with an outer circumference and a closed bottom portion, a liquid in the bottle cooled by evaporative cooling, the bottle cover comprising:

an absorbent exterior shell adapted for receipt around an outer circumference of the center portion of the liquid bottle, said exterior shell having an absorbent open cell center section and a fabric exterior liner disposed next to an outside of said center section.

2. The bottle cover as described in claim 1 wherein said center section of the said exterior shell has a high void-volume open cell polyurethane center section.

3. The bottle cover as described in claim 2 wherein said polyurethane center section has a high void-volume open cell construction in a range 50 to 150 pores per linear inch.

4. The bottle cover as described in claim 2 wherein said polyurethane center section is made of hydrophilic polyurethane foam.

5. The bottle cover as described in claim 1 wherein said fabric exterior liner is made of a hydrophilic fabric.

6. The bottle cover as described in claim 1 further including a fabric interior liner disposed on an inside of said center section.

7. The bottle cover as described in claim 6 wherein said fabric interior liner is made of a hydrophilic fabric.

8. The bottle cover as described in claim 1 wherein said exterior shell is a flexible and a removable absorbent exterior shell adapted for releasable attachment to the center portion and closed bottom portion of the bottle, said exterior shell made of an elastic material.

9. A bottle cover for a liquid bottle used on a bicycle and other outdoor vehicles, the liquid bottle supported by a hanging device mounted on the bicycle, the bottle having a open top portion, an elongated center portion with an outer circumference and a closed bottom portion, a liquid in the bottle cooled by evaporative cooling, the bottle cover comprising:

a flexible absorbent exterior shell adapted for receipt around an outer circumference of the center portion of the liquid bottle, said exterior shell having a high void-volume open cell polyurethane center section;

a fabric exterior liner disposed next to an outside of the center section of said exterior shell; and a fabric interior liner disposed next to an inside of the center section of said exterior shell.

10. The bottle cover as described in claim 9 wherein said polyurethane center section has a high void-volume open cell construction in a range 50 to 90 pores per inch.

11. The bottle cover as described in claim 9 wherein said polyurethane center section is made of hydrophilic polyurethane foam.

12. The bottle cover as described in claim 9 wherein said fabric exterior liner is made of a hydrophilic fabric, said exterior liner bonded to said said center section.

13. The bottle cover as described in claim 9 wherein said fabric interior liner is made of a hydrophilic fabric, said interior liner bonded to said center section.

14. The bottle cover as described in claim 9 wherein said exterior shell is adapted for releasable attachment to the center portion and closed bottom portion of the bottle, said exterior shell made of an elastic material.

15. A self-chilling liquid container for a bicycle and other outdoor vehicles, the liquid container supported by a hanging device mounted on the bicycle, the liquid in the container is cooled by evaporative cooling, the container comprising:

a bottle having a top portion with an opening therein for filling the bottle, a closed bottom portion and an elongated center portion;

a flexible absorbent exterior shell received around the outer circumference of the center portion of said bottle and secured thereto, said absorbent exterior shell having an absorbent open cell center section; and a fabric exterior liner disposed on an outside of the center section of said exterior shell.

16. The bottle cover as described in claim 15 further including a fabric interior liner disposed on an inside of said center section of said exterior shell.

17. The container as described in claim 15 wherein said exterior shell is made of a stretchable elastic material for releasable attachment to the bottle.

18. The container as described in claim 15 wherein said center section of the said exterior shell is made of a high void-volume open cell polyurethane center section.

19. The bottle cover as described in claim 18 wherein said polyurethane center section is made of hydrophilic polyurethane foam.

20. The container as described in claim 15 wherein said polyurethane center section has a high void-volume open cell construction in a range 50 to 150 pores per inch.

\* \* \* \* \*